United States Patent Office 3,329,478
Patented July 4, 1967

3,329,478
METHOD OF REMOVING NITROGEN OXIDES FROM GASES
Robert Garlet, Toulouse, France, assignor to Office National Industriel de l'Azote, Toulouse, France, a corporation of France
No Drawing. Filed July 8, 1963, Ser. No. 297,170
Claims priority, application France, July 11, 1962, 4,812
6 Claims. (Cl. 23—2)

For many years industry has had difficulty in fixing the total amount of nitrogen oxides during nitric acid synthesis with ammonia oxidation. For this reason tail gases from manufacturing plants are usually colored by "rutilant" vapors. The effluent gases contain on an average from 0.1 to 0.5% by volume of a mixture of nitrogen monoxide (NO) and nitric oxide ($NO_2$), 3.0 to 4.0% of free oxygen, and residual amounts of nitrogen and water vapor.

Discharging these gaseous products into the atmosphere results in a noticeable loss of fixed nitrogen and, due to the corrosive and toxic nature of entrained nitrogen oxides, serious problems of protection, plant maintenance, and air pollution will arise.

Many processes for the destruction of these nitrogen-oxygen fumes, involving their fixation or transformation within a solvent or an absorbing mass, have been proposed in the last decades. These methods, however, generally entail high operating costs due to the use of costly solvents, complicated regeneration processes, or prohibitive amounts of energy.

More recently, a process was developed in the United States enabling the total destruction of such nitrogen oxides by the use of catalytic reduction at a temperature of about 400° C., in the presence of a catalyst after adding a reducing combustible gas such as hydrogen, carbon monoxide or a gaseous hydrocarbon. The process, which has excellent effectiveness, presents, however, the disadvantage of requiring high investments and large equipment.

The problem is difficult to solve in a more economical way primarily because of the huge volume of total residual gases having only a low concentration of nitrogen oxides and also because of the presence of large amounts of water vapor in the residual gases.

The present invention is essentially concerned with a gas-washing process carried out at normal pressure and temperature utilizing inexpensive lyes and which is easily valorisable. The process presents enough effectiveness so that the nitric oxide content of the air in the vicinity of the discharge point is reduced to a level lower than the level of toxicity which ranges about 20 milligrams/cubic meter or about 10 p.p.m.

The process of the invention is based on the determination that an aqueous solution of ammonium sulfite and bisulfite will react quickly, under normal conditions of temperature and pressure, with nitrogen oxides of an oxidation degree higher than 2, to become oxidized quantitatively into ammonium sulfate.

The transformation mechanism is rather complex as free oxygen contained in the gases to be treated will be also involved in the oxidation reactions. That is why it is noted that in practice one mole of nitric oxide reduced into molecular nitrogen corresponds to the oxidation of three to four moles of sulfite or bisulfite.

A comparatively small fraction of nitrogen oxides, however, react in the form of nitrous anhydride according to the following reactions:

$N_2O_3 + 4(NH_4)_2SO_3 + 3H_2O \rightarrow$
$\quad 2N(OH)(NH_4SO_3)_2 + 4NH_4OH$ (1)
$N_2O_3 + 4NH_4HSO_3 \rightarrow 2N(OH)(NH_4SO_3)_2 + H_2O$ (2)
$NH_4HSO_4 + NH_4OH \rightarrow (NH_4)_2SO_4 + H_2O$ (3)

According to a particular aspect of the invention, it has been found that the ammonia solutions which had served to purify the residual gases containing sulfur dioxide could be used advantageously and be recovered in the form of ammonium sulfate.

As a rule, the molar ratio of bisulfite to sulfite in washing solutions should not depart from the range 0.1 to 0.4. If the upper limit is exceeded, a commencement of decomposition of the bisulfite will take place, in acidic medium, with release of sulfur dioxide. On the other hand, if the ratio falls under the lower limit, the above reaction (1) tends to make the medium ammoniacal, an effect compensated by the immediate reaction of this ammonia with bisulfite and/or formed bisulfite, according to reaction (3).

It is possible to operate at space velocities of 1,300 to 1,500 volume units of gas per hour per effective volume unit of washing column; this is possible because of the rate of oxidation reactions together with the level of perfection of modern columns for gas-liquid contact.

The flow rate of the washing solution in a given apparatus is chosen so that, while obtaining a very extensive oxidation into sulfate, there still remains some proportion of unreacted sulfite and bisulfite. This limitation is essentially intended to avoid the formation of a mixture of nitrite and nitrate which would form in the absence of reducing compound by the dissolution of nitric oxide in water according to the following reactions:

$$2NO_2 \rightarrow N_2O_4 \quad (4)$$
$$N_2O_4 + H_2O \rightarrow HNO_2 + HNO_3 \quad (5)$$

Due to their great dilution, these acids present in the solution would have no oxidizing effect but they can contribute to shift the gaseous sulfur dioxide by reacting with bisulfite as pointed out above.

By applying the optimum conditions of the process of the invention in a washing column of conventional design it is possible to obtain practically odorless and colorless treated gases containing only traces of nitrogen oxide in the form of NO and also containing a mist of white fumes from water vapor condensation on ammonium and sulfate ions passed out of the apparatus. If desired, this mist can be removed by electrostatic precipitation.

Another aspect of the invention relates to a method for utilizing spent lyes by extracting the ammonium sulfate formed. These lyes also contain unreacted ammonium sulfite and bisulfite together with small amounts of ammoniacal salt of the hydroxylamine-disulfonic acid and traces of ammonium nitrite.

By heating the solution to a boil, ammonium bisulfite reacts with the traces of nitrite and the shifted sulfur dioxide can then be advantageously absorbed in a fresh solution of sulfite-bisulfite. During the heating the small amounts of ammoniacal salt of hydroxylamine-disulfonic acid, formed in the course of washing by reactions (1) and (2), are hydrolysed into the ammoniacal salt of the hydroxylamine-monosulfonic acid, $NH(OH)(NH_4SO_3)$, and removal of this salt may be dispensed with.

After adjusting solution pH to the desired value, ammonium sulfate is crystallized in the usual way.

Of course, the process just described, in its essential features, is applicable to all the industrial residual gases containing nitrogen oxides, as for instance the gaseous effluents from plants for organic nitration, metal nitric-attack, nitrate thermal-decomposition, etc.

The following example is given by way of illustration only, it being understood that it does not constitute any limitation whatsoever of the invention.

*Example*

A stream of 160 cubic meters/hour of tail gas from a nitric acid synthesis plant, containing 0.17% of nitrogen oxides ($NO + NO_2$), 3.0% of oxygen, the remainder being essentially nitrogen and water vapor, are passed upwardly through a 0.1 square meter section and 1.60 meter high column packed with 15 millimeter Raschig rings.

For the reduction of nitrogen oxides, a residual sulfite liquor from the washing of sulfur dioxide-bearing industrial gases with an aqueous solution of ammonia, is used.

This liquor has the following molar composition:

0.8 mole/liter of $NH_4HSO_3$,
2.3 moles/liter of $(NH_4)_2SO_3$
0.8 mole/lieer of $NH_4HSO_3$, the bisulfite to sulfite ratio being 0.35.

The sulfite liquor is passed through the washing columns in counter-flow to the tail gas, the flow-rate being adjusted so that there may remain only about 10% of sulfite+bisulfite ions in the lye after such contact. In order to reach such a result, a stream of 35 liters/hour of spent liquor is continuously recycled to the column head while simultaneously injecting 16 liters/hour of fresh liquor corresponding to the hourly consumption of sulfite solution.

Treated gases discharged into the atmosphere contain 0.05% of nitric oxide (an amount not visible to the eye and becoming quickly diluted in the atmosphere), 50 milligrams/cubic meter of sulfur trioxide, and traces of ammonia.

The spent solution, after heating to a boil, contains about 3.85 moles/liter of ammonium sulfate, together with small amounts of the ammoniacal monosulfonated derivative of the hydroxylamine corresponding, on an average, to 2.5 grams/liter of $NH_2(OH)$. By treating this solution with the object of sulfate crystallization, about 22 kilograms of $(NH_4)_2SO_4$ per cubic meter of nitrous fumes are obtained.

What is claimed is:

1. A method of reducing the nitrogen-oxide content of tail gases to reduce air pollution comprising passing said tail gases containing small quantities, not substantially greater than about 0.5% by volume, of nitrogen oxide having an oxidation degree above 2 into an essentially vertical washing column at a space velocity of 1,300 to 1,500 volume units of gas per hour per effective volume unit of washing column and into contact therein with an aqueous solution of ammonium sulfite and bisulfite, the molar ratio of bisulfite to sulfite lying within the range 0.1 to 0.4;

washing and reacting said nitrogen-oxide with said ammonium sulfite and bisulfite under ambient conditions of temperature and pressure within said washing column to reduce the level of nitrogen-oxide content of said tail gases;

and discharging said tail gases of reduced nitrogen-oxide content to the atmosphere, said nitrogen-oxide content of the atmosphere in the vicinity of tail gas discharge being thereby reduced to about 10 p.p.m.

2. A method in accordance with claim 1 wherein the following reactions take place during washings:

$$N_2O_3 + 4(NH_4)_2SO_3 + 3H_2O \rightarrow 2NOH(NH_4SO_3)_2 + 4NH_4OH$$

$$N_2O_3 + 4NH_4HSO_3 \rightarrow 2NOH(NH_4SO_3)_2 + H_2O$$

$$NH_4HSO_4 + NH_4OH \rightarrow (NH_4)_2SO_4 + H_2O$$

3. A method in accordance with claim 1 wherein the used washing solution is heated to the boiling point and ammonium sulfate is crystallized therefrom.

4. A method in accordance with claim 1 wherein the washing solution is a residual sulfite liquor from the washing of sulphur dioxide containing industrial gases with an aqueous solution of ammonia.

5. A method in accordance with claim 1 wherein the flow is counter-current, said aqueous solution being fed to the head of said vertical column.

6. A method in accordance with claim 5 wherein a portion of the used washing solution is recycled to the head of said vertical column.

References Cited

UNITED STATES PATENTS 2,011,307   8/1935   Peski ---------------- 23—119
2,095,074   10/1937  Muus ---------------- 23—119

OSCAR R. VERTIZ, *Primary Examiner.*

EARL C. THOMAS, *Examiner.*

UNITED STATES PATENT OFFICE
CERTIFICATE OF CORRECTION

Patent No. 3,329,478                                              July 4, 1967

Robert Garlet

It is hereby certified that error appears in the above numbered patent requiring correction and that the said Letters Patent should read as corrected below.

Column 3, line 10, for "0.8 mole/liter of $NH_4HSO_3$" read -- 0.22 moles/liter of $(NH_4)_2SO_4$ --; column 3, line 12, for "lieer" read -- liter --.

Signed and sealed this 9th day of January 1968.

(SEAL)
Attest:

Edward M. Fletcher, Jr.                              EDWARD J. BRENNER
Attesting Officer                                          Commissioner of Patents